US008727267B2

(12) United States Patent
Jain et al.

(10) Patent No.: US 8,727,267 B2
(45) Date of Patent: May 20, 2014

(54) VARIABLE CONTRACTION RATIO NACELLE ASSEMBLY FOR A GAS TURBINE ENGINE

(75) Inventors: Ashok K. Jain, Tempe, AZ (US); Michael Winter, New Haven, CT (US)

(73) Assignee: United Technologies Corporation, Hartford, CT (US)

( * ) Notice: Subject to any disclaimer, the term of this patent is extended or adjusted under 35 U.S.C. 154(b) by 1848 days.

(21) Appl. No.: 11/750,398

(22) Filed: May 18, 2007

(65) Prior Publication Data
US 2008/0283676 A1 Nov. 20, 2008

(51) Int. Cl.
*B64D 33/02* (2006.01)

(52) U.S. Cl.
USPC ........................................ 244/53 B

(58) Field of Classification Search
USPC .... 244/53 B, 99.2, 99.8, 53 R, 134 R, 134 A; 137/15.2, 15.1
See application file for complete search history.

(56) References Cited

U.S. PATENT DOCUMENTS

| 2,948,111 | A | | 5/1955 | Nelson |
| 3,222,863 | A | * | 12/1965 | Klees et al. .................. 138/43 |
| 3,568,694 | A | | 3/1971 | Johnson |
| 3,583,417 | A | * | 6/1971 | Clark et al. .................. 137/15.1 |
| 3,611,724 | A | | 10/1971 | Kutney |
| 3,623,494 | A | * | 11/1971 | Poucher ...................... 137/15.2 |
| 3,664,612 | A | | 5/1972 | Skidmore et al. |
| 3,716,209 | A | | 2/1973 | Pierce |
| 4,007,891 | A | | 2/1977 | Sorensen et al. |
| 4,044,973 | A | | 8/1977 | Moorehead |
| 4,083,181 | A | | 4/1978 | Adamson |
| 4,147,029 | A | | 4/1979 | Sargisson |
| 4,199,295 | A | | 4/1980 | Raffy et al. |
| 4,351,502 | A | | 9/1982 | Statkus |
| 4,475,702 | A | * | 10/1984 | Cole ........................... 244/214 |
| 4,540,143 | A | | 9/1985 | Wang et al. |
| 4,722,357 | A | | 2/1988 | Wynosky |
| 4,827,712 | A | | 5/1989 | Coplin |
| 4,865,268 | A | | 9/1989 | Tracksdorf |
| 4,899,958 | A | | 2/1990 | Horikawa |
| 4,912,921 | A | | 4/1990 | Rice et al. |
| 4,993,663 | A | | 2/1991 | Lahti et al. |
| 5,000,399 | A | | 3/1991 | Readnour et al. |

(Continued)

FOREIGN PATENT DOCUMENTS

EP 1607603 A2 12/2005
GB 800380 8/1958

(Continued)

OTHER PUBLICATIONS

Extended European Search Report for Application No. 08252429.9 mailed Nov. 26, 2008.

(Continued)

*Primary Examiner* — Tien Dinh
*Assistant Examiner* — Justin Benedik
(74) *Attorney, Agent, or Firm* — Carlson, Gaskey & Olds

(57) ABSTRACT

A nacelle assembly includes an inlet lip section having a highlight diameter and a throat diameter. One of the highlight diameter and the throat diameter is fixed and the other of the highlight diameter and the throat diameter is selectively adjustable in each of a first direction and a second direction relative to the inlet lip section to influence a contraction ratio associated with the inlet lip section.

10 Claims, 4 Drawing Sheets

(56) References Cited

U.S. PATENT DOCUMENTS

| | | | |
|---|---|---|---|
| 5,012,639 A | 5/1991 | Ream et al. | |
| 5,014,933 A * | 5/1991 | Harm et al. | 244/53 B |
| 5,058,617 A | 10/1991 | Stockman et al. | |
| 5,127,222 A | 7/1992 | Ream et al. | |
| 5,143,329 A | 9/1992 | Coffinberry | |
| 5,145,126 A | 9/1992 | Patilla | |
| 5,177,957 A * | 1/1993 | Grieb | 60/226.1 |
| 5,261,227 A | 11/1993 | Giffin, III | |
| 5,284,012 A | 2/1994 | Laborie et al. | |
| 5,297,765 A | 3/1994 | Hughes et al. | |
| 5,351,476 A | 10/1994 | Laborie et al. | |
| 5,361,828 A | 11/1994 | Lee et al. | |
| 5,447,283 A | 9/1995 | Tindell | |
| 5,586,431 A | 12/1996 | Thonebe et al. | |
| 5,593,112 A | 1/1997 | Maier et al. | |
| 5,626,017 A | 5/1997 | Sattelmayer | |
| 5,743,488 A | 4/1998 | Rolston et al. | |
| 5,971,328 A * | 10/1999 | Kota | 244/219 |
| 5,987,880 A | 11/1999 | Culbetson | |
| 6,089,505 A * | 7/2000 | Gruensfelder et al. | 244/53 B |
| 6,109,566 A | 8/2000 | Miller et al. | |
| 6,129,311 A | 10/2000 | Welch et al. | |
| 6,179,251 B1 | 1/2001 | Tindell et al. | |
| 6,231,006 B1 * | 5/2001 | Gruensfelder et al. | 244/53 B |
| 6,260,567 B1 * | 7/2001 | Gruensfelder et al. | 137/1 |
| 6,334,753 B1 | 1/2002 | Tillman et al. | |
| 6,340,135 B1 | 1/2002 | Barton | |
| 6,360,989 B1 | 3/2002 | Maguire | |
| 6,379,110 B1 | 4/2002 | McCormick et al. | |
| 6,390,418 B1 | 5/2002 | McCormick et al. | |
| 6,651,929 B2 | 11/2003 | Dionne | |
| 6,655,632 B1 | 12/2003 | Gupta et al. | |
| 6,708,711 B2 | 3/2004 | Surply et al. | |
| 6,764,043 B2 | 7/2004 | Sankrithi et al. | |
| 6,971,229 B2 | 12/2005 | Lair | |
| 7,048,229 B2 | 5/2006 | Sanders et al. | |
| 7,090,165 B2 | 8/2006 | Jones et al. | |
| 7,131,612 B2 | 11/2006 | Baptist et al. | |
| 7,165,744 B2 | 1/2007 | Howarth et al. | |
| 7,384,016 B2 | 6/2008 | Kota et al. | |
| 7,617,670 B2 | 11/2009 | Truax et al. | |
| 7,735,601 B1 | 6/2010 | Stieger et al. | |
| 2004/0037162 A1 | 2/2004 | Flohr et al. | |

FOREIGN PATENT DOCUMENTS

| | | |
|---|---|---|
| GB | 1067129 | 5/1967 |
| GB | 1070458 | 6/1967 |
| GB | 1312619 | 4/1973 |
| GB | 1336724 | 11/1973 |
| GB | 1382809 | 2/1975 |

OTHER PUBLICATIONS

U.S. Appl. No. 11/584,030, filed Oct. 20, 2006, Morford, et al.
U.S. Appl. No. 11/595,040, filed Nov. 10, 2006, Winter, et al.
U.S. Appl. No. 11/749,260, filed May 16, 2007, Jain, et al.
U.S. Appl. No. 11/739,216, filed Apr. 24, 2007, Jain, et al.
U.S. Appl. No. 11/772,287, filed Jul. 2, 2007, Jain, et al.
U.S. Appl. No. 11/769,749, filed Jun. 28, 2007, Jain, et al.
Extended European Search Report for Application No. EP 08 25 3874 dated Jan. 25, 2012.
Extended European Search Report for Application No. EP 08 25 1743 dated Mar. 25, 2013.

* cited by examiner

VARIABLE CONTRACTION RATIO NACELLE ASSEMBLY FOR A GAS TURBINE ENGINE

BACKGROUND OF THE INVENTION

This invention generally relates to a gas turbine engine, and more particularly to a nacelle assembly for a gas turbine engine.

In an aircraft gas turbine engine, such as a turbofan engine, air is pressurized in a compressor and mixed with fuel in a combustor for generating hot combustion gases. The hot combustion gases flow downstream through turbine stages which extract energy from the hot combustion gases. A fan supplies air to the compressor.

Combustion gases are discharged from the turbofan engine through a core exhaust nozzle and a quantity of fan air is discharged through an annular fan exhaust nozzle defined at least partially by a nacelle assembly surrounding the core engine. A majority of propulsion thrust is provided by the pressurized fan air which is discharged through the fan exhaust nozzle, while the remaining thrust is provided from the combustion gases discharged through the core exhaust nozzle.

It is known in the field of aircraft gas turbine engines that the performance of a turbofan engine varies during diversified operability conditions experienced by the aircraft. An inlet lip section located at the foremost end of the turbofan nacelle assembly is typically designed to enable operation of the turbofan engine and reduce separation of airflow from the internal surfaces of the inlet lip section during these diversified conditions. For example, the inlet lip section requires a "thick" inlet lip section to support operation of the engine during specific flight conditions, such as crosswind conditions, take-off conditions and the like. Disadvantageously, the "thick" inlet lip section may reduce the efficiency of the turbofan engine during normal cruise conditions of the aircraft, for example. As a result, the maximum diameter of the nacelle assembly is approximately 10-20% larger than required during cruise conditions.

Nacelle assemblies having a variable air inlet are known which alter the shape of the inlet lip section during take-off and landing conditions to reduce the drag experienced by the aircraft. Variable air inlets of this type include a plurality of actuating mechanisms that effectuate the shape change of the inlet lip section. Disadvantageously, the actuating mechanisms are mechanically complex, difficult to incorporate into the nacelle assembly, and provide negative weight penalties. Additionally, these systems have not fully reduced the drag penalties and flow separation problems that occur during aircraft operation.

Accordingly, it is desirable to improve the performance of a turbofan gas turbine engine during diversified conditions to provide a nacelle assembly having a reduced thickness, reduced weight and reduced drag.

SUMMARY OF THE INVENTION

A nacelle assembly includes an inlet lip section having a highlight diameter and a throat diameter. One of the highlight diameter and the throat diameter is fixed and the other of the highlight diameter and the throat diameter is selectively adjustable in each of a first direction and a second direction relative to the inlet lip section to influence a contraction ratio associated with the inlet lip section.

A structural assembly for a gas turbine engine includes a nacelle assembly having an inlet lip section positioned adjacent a forward segment of the nacelle assembly. The inlet lip section includes a mechanism having an adjustable shape. The mechanism is selectively moveable to alter the adjustable shape and influence a contraction ratio of the inlet lip section.

A method of adjusting a contraction ratio associated with an inlet lip section of a gas turbine engine includes detecting an operability condition, and adjusting the inlet lip section in each of an axial direction and a radial direction relative to one of a highlight diameter and a throat diameter in response to the detected operability condition.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
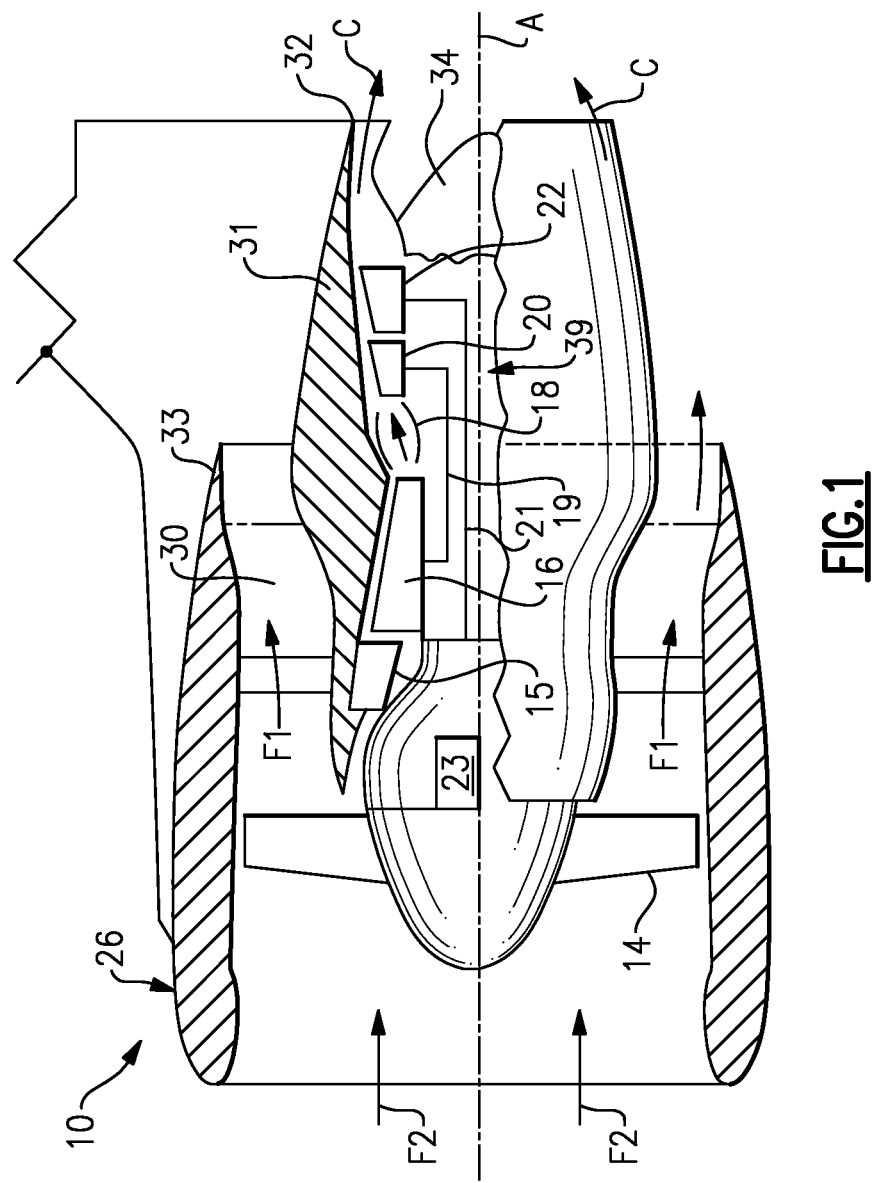
FIG. 1 illustrates a general perspective view of a gas turbine engine.

FIG. 1 illustrates a gas turbine engine 10 which includes (in serial flow communication) a fan section 14, a low pressure compressor 15, a high pressure compressor 16, a combustor 18, a high pressure turbine 20, and a low pressure turbine 22. During operation, air is pulled into the gas turbine engine 10 by the fan section 14, pressurized by the compressors 15, 16 and is mixed with fuel and burned in the combustor 18. Hot combustion gases generated within the combustor 18 flow through the high and low pressure turbines 20, 22 which extract energy from the hot combustion gases.

In a two spool design, the high pressure turbine 20 utilizes the extracted energy from the hot combustion gases to power the high pressure compressor 16 through a high speed shaft 19, and a low pressure turbine 22 utilizes the energy extracted from the hot combustion gases to power the low pressure compressor 15 and the fan section 14 through a low speed shaft 21. However, the invention is not limited to the two spool gas turbine architecture described and may be used with other architecture such as a single spool axial design, a three spool axial design and other architectures. That is, the present invention is applicable to any gas turbine engine, and to any application.

The example gas turbine engine 10 is in the form of a high bypass ratio turbofan engine mounted within a nacelle assembly 26, in which a significant amount of air pressurized by the fan section 14 bypasses the core engine 39 for the generation of propulsion thrust. The nacelle assembly 26 partially surrounds an engine casing 31, which houses the core engine 39.

The airflow entering the fan section 14 may bypass the core engine 39 via a fan bypass passage 30 that extends between the nacelle assembly 26 and the engine casing 31 for receiving and communicating a discharge airflow F1. The high bypass flow arrangement provides a significant amount of thrust for powering an aircraft.

The engine 10 may include a gear train 23 which reduces the speed of the rotating fan section 14. The gear train 23 can be any known gear system, such as a planetary gear system with orbiting planet gears, a planetary gear system with non-orbiting planet gears, or other type of gear system. In the disclosed example, the gear train 23 has a constant gear ratio. It should be understood, however, that the above-parameters are only exemplary of a contemplated geared turbofan engine 10. That is, the invention is applicable to traditional turbofan engines as well as other engine architectures.

The discharge airflow F1 is discharged from the engine 10 through a fan exhaust nozzle 33. Core exhaust gases C are discharged from the core engine 39 through a core exhaust nozzle 32 positioned between the engine casing 31 and a center plug 34 disposed coaxially about a longitudinal centerline axis A of the gas turbine engine 10.

Figure 2:
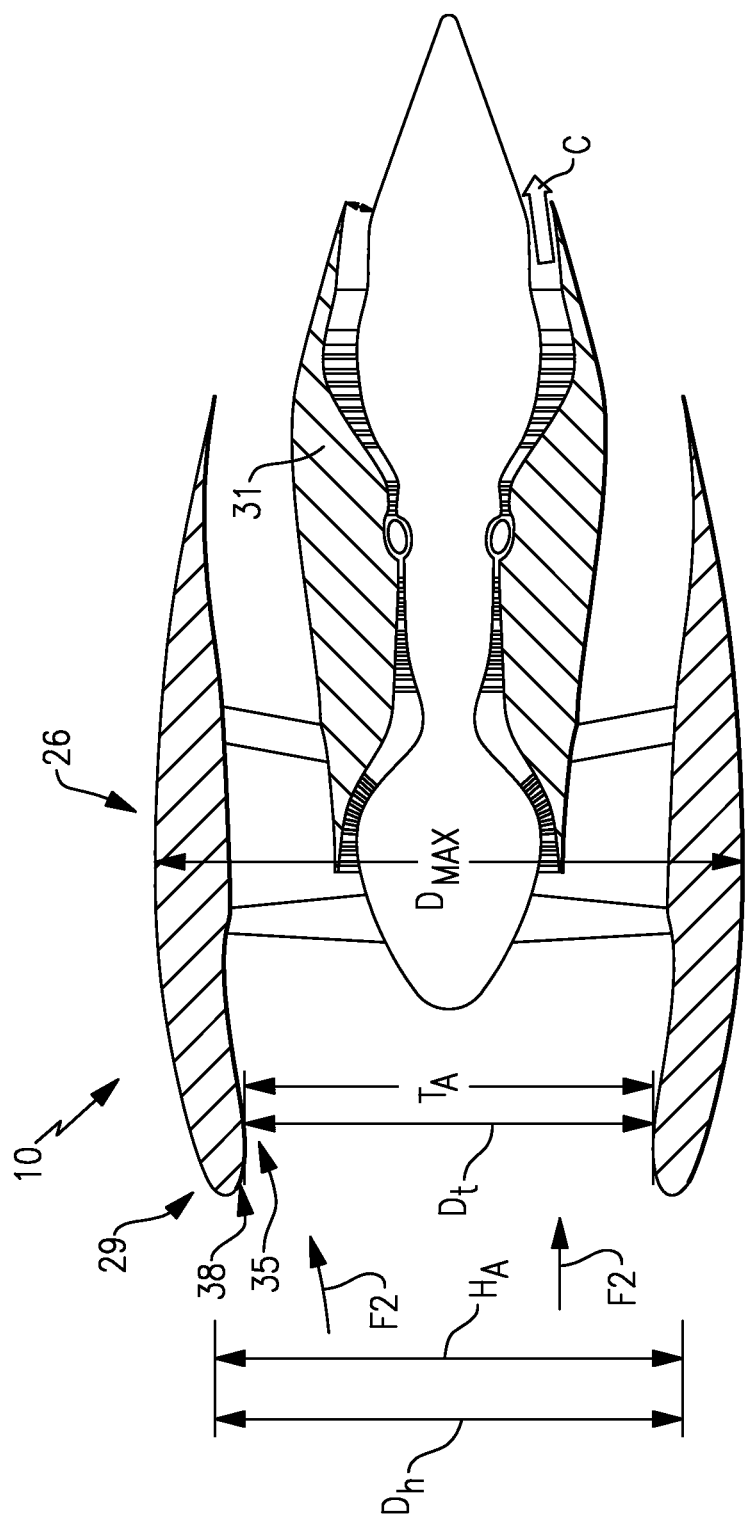
FIG. 2 illustrates a nacelle assembly of the gas turbine engine illustrated in FIG. 1.

FIG. 2 illustrates an example inlet lip section 38 of the nacelle assembly 26. The inlet lip section 38 is positioned near a forward segment 29 of the nacelle assembly 26. A boundary layer 35 is associated with the inlet lip section 38. The boundary layer 35 represents an area adjacent to a flow surface of the inlet lip section 38 at which the velocity gradient of airflow is zero. That is, the velocity profile of oncoming airflow F2 goes from a free stream away from the boundary layer 35 to near zero at the boundary layer 35 due to the friction forces that occur as the oncoming airflow F2 passes over the outer flow surface of the inlet lip section 38.

The nacelle assembly 26 also defines a contraction ratio. The contraction ratio represents a relative thickness of the inlet lip section 38 of the nacelle assembly 26 and is represented by the ratio of a highlight area $H_a$ (ring shaped area defined by a highlight diameter $D_h$) and a throat area $T_a$ (ring shaped area defined by throat diameter $D_t$) of the nacelle assembly 26. Current design considerations typically require a contraction ratio of approximately 1.33 to accommodate each operability condition of the aircraft and prevent the separation of the oncoming airflow F2 from the inlet lip section 38 during engine operation and limit the amount of drag experienced by the aircraft during flight. "Thick" inlet lip section designs, which are associated with large contraction ratios, increase the maximum diameter $D_{max}$ and increase weight and drag penalties associated with the nacelle assembly 26 during certain operability conditions.

Adjusting the contraction ratio associated with the inlet lip section 38 during each specific flight condition experienced by the aircraft reduces the boundary layer separation and drag penalties that occur at specific flight conditions. In one example, the adjustable contraction ratio is achieved by providing an inlet lip section 38 having a variable geometry, as is further discussed below.

Figure 3:
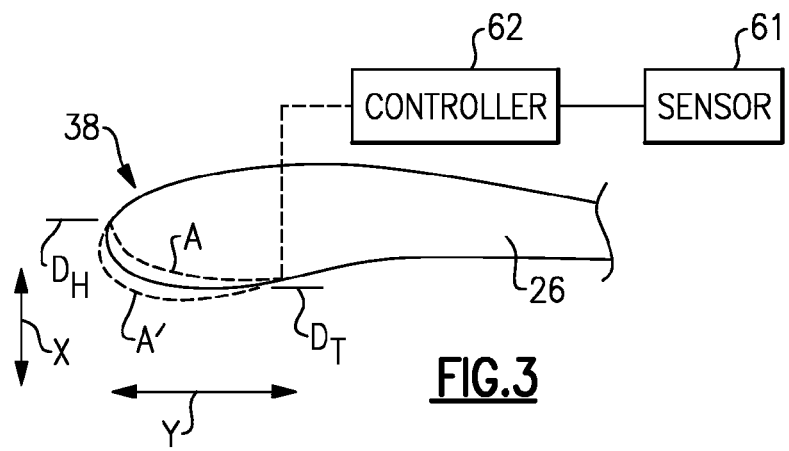
FIG. 3 illustrates an inlet lip section of the nacelle assembly of the gas turbine engine shown in FIG. 1.

FIG. 3 illustrates an example lip section 38 having an adjustable contraction ratio. The contraction ratio of the inlet lip section 38 is adjusted by translating a portion of the inlet lip section 38 in response to detecting an operability condition.

A sensor 61 detects the operability condition and communicates with a controller 62 to translate the inlet lip section 38 in a radial direction X and an axial direction Y relative to the nacelle assembly 26. Of course, this view is highly schematic. In addition, the illustrations of the movement of the inlet lip section 38 in the directions X and Y are shown exaggerated to better illustrate the contraction ratio adjustment of the inlet lip section 38. A person of ordinary skill in the art would understand the distances the inlet lip section 38 should be displaced in each of the X and Y directions in response to sensing each specific operability condition. It should be understood that the sensors 61 and the controller 62 may be programmable to detect any known operability condition of the aircraft and that each operability condition will be associated with a distinct contraction ratio. That is, the sensors 61 and the controller 62 are operable to position the inlet lip section 38 at an appropriate contraction ratio that corresponds to the operability condition that is detected (i.e., the contraction ratio is controlled via a predetermined schedule programmed within the controller 62). Also, the sensor 61 can be replaced by any controller associated with the gas turbine engine 10 or an associated aircraft. In fact, the controller 62 itself can generate the signal to adjust the contraction ratio of the inlet lip section 38.

In one example, the highlight diameter $D_h$ of the inlet lip section 38 is fixed and the throat diameter $D_t$ is adjusted in the radial direction X and the axial direction Y to alter the contraction ratio of the inlet lip section 38. The throat diameter $D_t$ of the inlet lip section 38 is translated in a radial inward and axially downstream direction where a "thin" inlet lip section 38 is required, such as during cruise conditions, for example (Labeled position A in FIG. 3). The throat diameter $D_t$ is moved in a radially outward direction and an axially upstream direction in response to detecting operability conditions requiring a "thick" inlet lip section 38 (labeled as position A' in FIG. 3). It should be understood that the actual distances the inlet lip section 38 is translated in the radial and axial directions will vary depending upon design specific parameters including but not limited to the operability conditions experienced by the aircraft.

Figure 4:
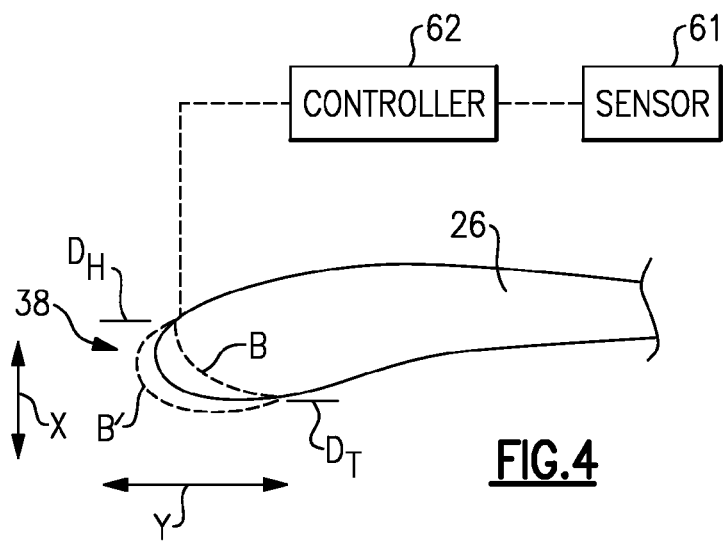
FIG. 4 illustrates another example inlet lip section for the nacelle assembly of the gas turbine engine illustrated in FIG. 1.

In another example, as illustrated in FIG. 4, the throat diameter $D_t$ of the inlet lip section 38 is fixed and the highlight diameter $D_h$ of the inlet lip section 38 is varied to adjust the contraction ratio of the inlet lip section 38. The highlight diameter $D_h$ is translated in a radially inward direction and an axially downstream direction where a "thin" inlet lip section 38 is required, such as during cruise conditions, for example (Labeled as position B in FIG. 4). The highlight diameter $D_h$ is moved in a radial outward direction and an axially upstream direction where a "thick" inlet lip section 38 is required (Labeled as position B' in FIG. 4). Although FIGS. 3 and 4 illustrate the contraction ratio adjustment relative to a single position of the highlight diameter $D_h$ or the throat diameter $D_t$, it should be understood that the movement could occur around the entire circumference of the nacelle assembly 26 to adjust the contraction ratio associated with the inlet lip section 38.

The contraction ratio of the inlet lip section 38 is selectively adjustable between a range of about 1 to about 1.4 and depends upon the detected operability condition. The term "about" as used in this description relative to the contraction ratio refers to possible variations in the contraction ratio, such as normally acceptable variations and tolerances in the art. A person of ordinary skill in the art would understand how to program the controller 62 of the gas turbine engine 10 to associate a distinct contraction ratio between the range of about 1 to about 1.4 for each operability condition the gas turbine engine 10 may experience during operation. In addition, the ratio of the maximum diameter $D_{max}$ relative to the highlight diameter $D_h$ is less than or equal to about 1.5, for example. A person of ordinary skill in the art would understand that other ratios of the maximum diameter $D_{max}$ relative to the highlight diameter $D_h$ are possible and will vary depending upon design specific parameters.

As stated above, the contraction ratio of the inlet lip section 38 is selectively adjusted in response to detecting an operability condition. In one example, the operability condition includes a take-off condition. In another example, the operability condition includes a climb condition. In yet another example, the operability condition includes a crosswind condition. Crosswind conditions are experienced during takeoff as an aircraft travels down a runway (i.e., where the aircraft experiences airflow in a roughly perpendicular direction with respect to the movement of aircraft down the runway). In still another example, the operability condition includes a windmilling condition. A windmilling condition occurs where an engine of a multi-engine aircraft loses functionality or is otherwise shutdown (i.e., an engine out condition). The damaged engine is advantageously permitted to rotate, and is driven by an airflow resulting from the forward velocity of the aircraft (i.e., the damaged engine is permitted to windmill). In yet another example, the operability condition includes cruise conditions of the aircraft. It should be understood that the contraction ratio of the inlet lip section 38 may be adjusted in a radial direction X and an axial direction Y, or to any position, in response to a detected operability condition.

Figure 5:
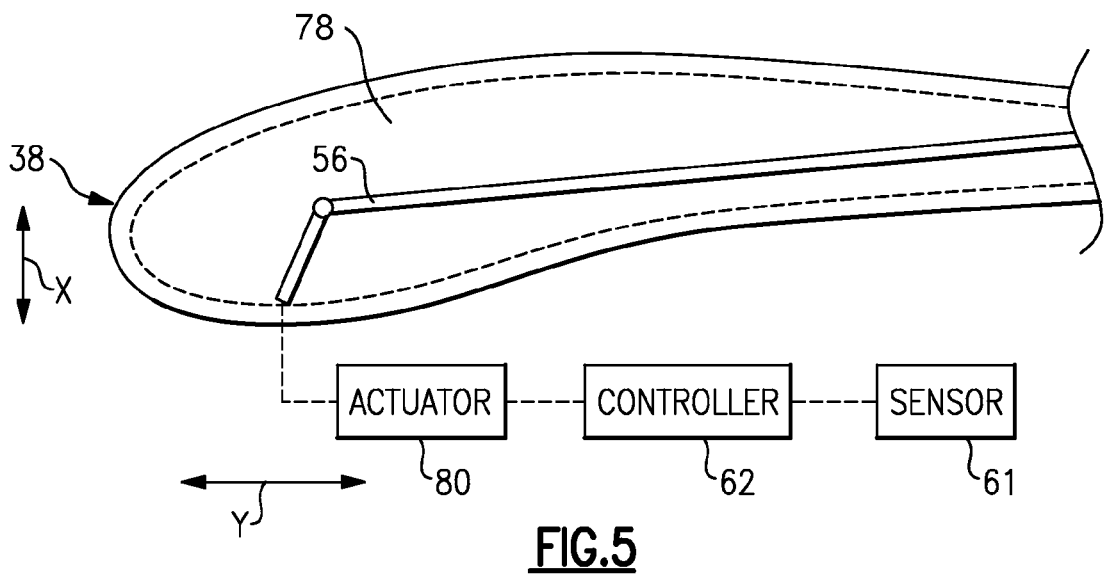
FIG. 5 illustrates an inlet lip section having an internal linkage for adjusting a contraction ratio associated with the inlet lip section.

The adjustment of the contraction ratio of the inlet lip section 38 may be achieved in a variety of ways. FIG. 5 illustrates an example internal linkage 56 utilized to adjust the contraction ratio associated with the inlet lip section 38. The internal linkage 56 is housed within a cavity 78 of the inlet lip section 38. An actuator assembly 80 deploys the internal linkage 56 by pivoting, toggling, and/or extending the internal linkage 56 to move one of the throat diameter $D_t$ or the highlight diameter $D_h$ in a radial direction X and/or an axial direction Y. A person of ordinary skill in the art having the benefit of this disclosure would be able to implement an appropriate actuator assembly 80 to translate the internal linkage 56. The example actuator assembly 80 could include a pneumatic, hydraulic, electromagnetic or any other type of actuator assembly. The inlet lip section 38 of the nacelle assembly 26 includes an outer skin comprised of a flexible material that is adjustable to achieve the contraction ratio adjustment. A person of ordinary skill in the art having the benefit of this disclosure would be able to choose an appropriate material for the flexible outer skin.

Figure 6:
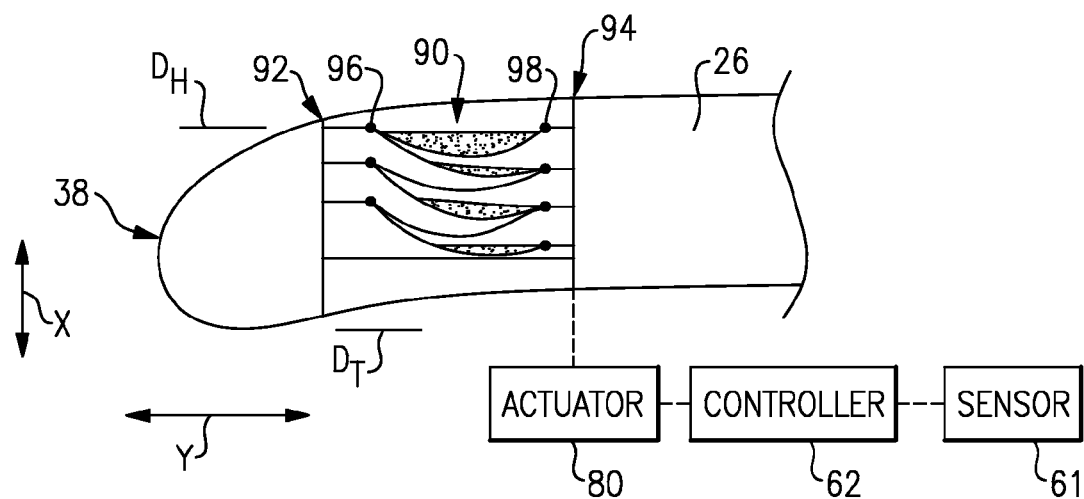
FIG. 6 illustrates another inlet lip section having a plurality of bellows for adjusting a contraction ratio associated with the inlet lip section.

FIG. 6 illustrates a second example mechanism for adjusting the contraction ratio of the inlet lip section 38. In this example, the inlet lip section 38 includes a plurality of bellows 90 positioned between a front bulk head 92 and a maximum thickness point 94 of the inlet lip section 38. The bellows 90 extend circumferentially about the entire nacelle assembly 26, although only a single position of the bellows 90 is illustrated in FIG. 6. Each bellow 90 includes a first hinge 96 positioned adjacent to the front bulk head 92 and a second hinge 98 positioned adjacent to the maximum thickness point 94 of the inlet lip section 38. Each bellow 90 is translatable in each of a radial direction and an axial direction with respect to either the highlight diameter $D_h$ or the throat diameter $D_t$ of inlet lip section 38 by moving the hinges 96, 98 either toward or away from one another (i.e., in either an upstream direction or downstream direction relative to one another). That is, one of the highlight diameter $D_h$ and the throat diameter $D_t$ is fixed. An actuator assembly 80 is associated with the bellows 90 to translate the bellows 90 in response to receiving a signal from the controller 62 representing a detected operability condition. To achieve the contraction ratio adjustment, the bellows 90 of the nacelle assembly 26 include an outer skin comprised of a flexible material. A person of ordinary skill in the art having the benefit of this disclosure would be able to choose an appropriate material for the flexible outer skin.

Figure 7:
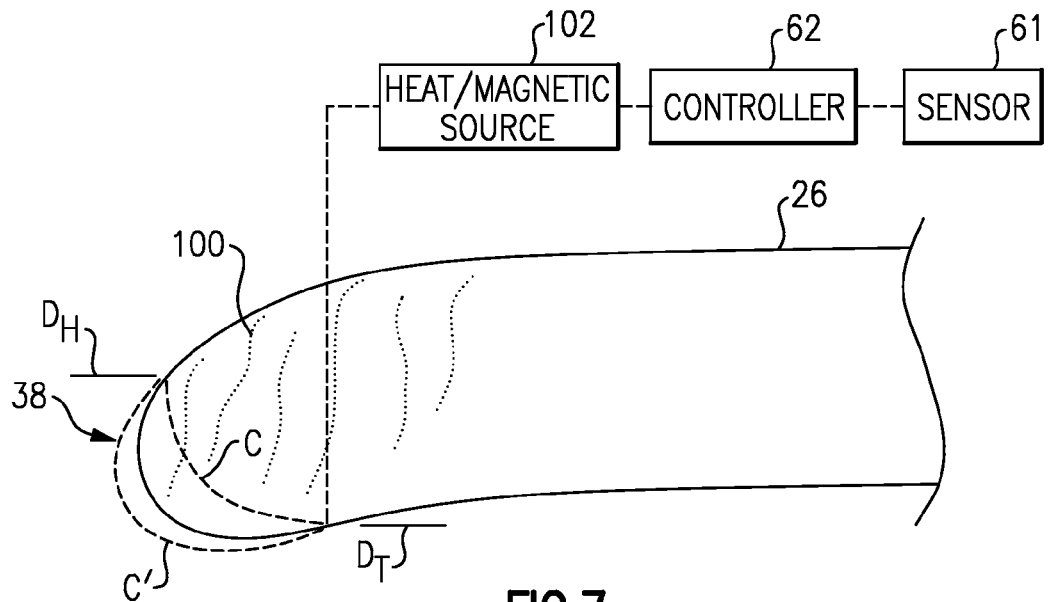
FIG. 7 illustrates yet another inlet lip section having a shape memory alloy for adjusting a contraction ratio associated with the inlet lip section.

FIG. 7 illustrates yet another example mechanism for adjusting the contraction ratio associated with the inlet lip section 38. In this example, the inlet lip section 38 comprises a shape memory alloy 100 having a first solid phase that corresponds to a first shape of the inlet lip section 38 and a second solid phase that corresponds to a second shape of inlet lip section 38. The inlet lip section 38 may be transitioned between the first solid phase and the second solid phase to adjust the contraction ratio of the inlet lip section 38. In one example, the second solid phase is radially inward and downstream relative to the first solid phase (labeled as position C in FIG. 7). In another example, the second solid phase is radially outward and upstream relative to the first solid phase (labeled as position C' in FIG. 7). The shape memory alloy is thermally or magnetically active to transition the shape memory alloy between the phases to change the shape of the inlet lip section 38 with respect to one of the highlight diameter $D_h$ and the throat diameter $D_t$.

In one example, the entire inlet lip section 38 includes a shape memory alloy. In another example, only the areas adjacent to either the highlight diameter $D_h$ or the throat diameter $D_t$ include a shape memory alloy.

One example thermally active shape memory alloy includes a nickel titanium alloy. A second example thermally active shape memory alloy includes a copper zinc aluminum alloy. Yet another example thermally active shape memory alloy includes a copper aluminum nickel alloy. One example mechanically active shape memory alloy includes a nickel manganese gallium alloy. However, other shape memory alloys may be utilized, as would be understood by those of ordinary skill in the art having the benefit of this disclosure. In combination with a source 102 that provides heat or a magnetic field in response to receiving a signal from the controller 62, the shape memory alloy provides the adjustment of the contraction ratio of the inlet lip section 38. To achieve the contraction ratio adjustment, the inlet lip section 38 of the nacelle assembly 26 includes an outer skin comprised of a flexible material. A person of ordinary skill in the art having the benefit of this disclosure would be able to choose an appropriate material for the flexible outer skin.

Adjusting the contracting ratio of the inlet lip section 38 during specific flight conditions accommodates competing design considerations of an aircraft by providing a "thick" inlet lip section 38 or a "thin" inlet lip section 38 as required by specific operating conditions. The drag experienced by the aircraft caused by the airflow communicated through the inlet lip section and the nacelle assembly is reduced. Therefore, efficiency is improved during all operability conditions of the gas turbine engine 10. In addition, the inlet lip section 38 operates with reduced flow separation and increased inlet pressure recovery during all flight conditions. A reduced maximum diameter of the nacelle assembly 26 may therefore be achieved while reducing weight, reducing fuel burn and increasing the overall efficiency of the gas turbine engine 10.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A nacelle assembly, comprising:
   an inlet lip section having a highlight diameter and a throat diameter, wherein one of said highlight diameter and said throat diameter of said inlet lip section is fixed and the other of said highlight diameter and said throat diameter is selectively adjustable in each of a first direction and a second direction relative to said inlet lip section to influence a contraction ratio associated with said inlet lip section; and said contraction ratio is selectively adjustable between a range of about 1 to about 1.4.

2. The assembly as recited in claim 1, comprising an internal linkage housed within said inlet lip section and selectively adjustable to influence said contraction ratio of said inlet lip section.

3. The assembly as recited in claim 1, wherein said first direction is upstream and said second direction is radially outward relative to said inlet lip section.

4. The assembly as recited in claim 1, wherein said first direction is downstream and said second direction is radially inward relative to said inlet lip section.

5. A method for adjusting a contraction ratio associated with an inlet lip section of a gas turbine engine, comprising the steps of:
(a) detecting an operability condition;
(b) fixing one of a highlight diameter and a throat diameter of the inlet lip section relative to the inlet lip section;
(c) adjusting the other of the highlight diameter and the throat diameter in each of an axial direction and a radial direction relative to the inlet lip section in response to the operability condition detected in said step (a); and
wherein the contraction ratio is adjustable between a range of about 1.0 to about 1.4.

6. The method as recited in claim 5, wherein the axial direction is an upstream direction and the radial direction is a radial outward direction, said step (c) comprising:
altering one of the highlight diameter and the throat diameter in each of the radial outward direction and the upstream direction.

7. The method as recited in claim 5, wherein the axial direction is a downstream direction and the radial direction is a radial inward direction, said step (c) comprising:
altering one of the highlight diameter and the throat diameter in each of the downstream direction and the radial inward direction.

8. The method as recited in claim 5, wherein a distinct contraction ratio is associated with each operability condition detected at said step (a), the method comprising the step of:
(d) programming each distinct contraction ratio into an engine controller.

9. The assembly as recited in claim 1, wherein one of said throat diameter and said highlight diameter is simultaneously adjustable in each of an axial direction and a radial direction.

10. A structural assembly for a gas turbine engine, comprising:
a nacelle assembly;
an inlet lip section positioned adjacent a forward segment of said nacelle assembly and having a highlight diameter and a throat diameter, wherein one of said highlight diameter and said throat diameter is fixed relative to said nacelle assembly and the other of said highlight diameter and said throat diameter includes an adjustable shape, and said adjustable shape is selectively manipulated simultaneously in each of an axial direction and a radial direction to influence a contraction ratio of said inlet lip section between a range of about 1 and about 1.4; and
a controller that identifies an operability condition, wherein the controller selectively alters said adjustable shape in response to said operability condition.

* * * * *